United States Patent
Shivalingappa et al.

(10) Patent No.: US 9,148,699 B2
(45) Date of Patent: Sep. 29, 2015

(54) OPTIMIZED ALGORITHM FOR CONSTRUCTION OF COMPOSITE VIDEO FROM A SET OF DISCRETE VIDEO SOURCES

(75) Inventors: Sujith Shivalingappa, Bangalore (IN); Sivaraj Rajamonickam, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 333 days.

(21) Appl. No.: 13/486,241

(22) Filed: Jun. 1, 2012

(65) Prior Publication Data

US 2013/0321704 A1   Dec. 5, 2013

(51) Int. Cl.
G09G 5/00    (2006.01)
H04N 9/74    (2006.01)
H04N 21/462  (2011.01)
G09G 5/14    (2006.01)
H04N 5/265   (2006.01)
H04N 21/431  (2011.01)

(52) U.S. Cl.
CPC ............ *H04N 21/4622* (2013.01); *G09G 5/14* (2013.01); *H04N 5/265* (2013.01); *H04N 21/4316* (2013.01)

(58) Field of Classification Search
USPC ........................................................ 345/629
See application file for complete search history.

(56) References Cited

U.S. PATENT DOCUMENTS

| | | | | |
|---|---|---|---|---|
| 5,351,067 A | * | 9/1994 | Lumelsky et al. | 345/561 |
| 5,963,956 A | * | 10/1999 | Smartt | 1/1 |
| 6,597,363 B1 | * | 7/2003 | Duluk et al. | 345/506 |
| 7,009,736 B2 | * | 3/2006 | Thakur | 358/3.06 |
| 7,340,687 B2 | * | 3/2008 | Sekiguchi et al. | 715/781 |
| 7,365,752 B2 | * | 4/2008 | Xie | 345/560 |
| 7,559,031 B2 | * | 7/2009 | Kawamura et al. | 715/753 |
| 8,078,981 B2 | * | 12/2011 | MacInnis et al. | 715/768 |
| 2008/0060034 A1 | * | 3/2008 | Egnal et al. | 725/105 |
| 2008/0198170 A1 | * | 8/2008 | Guha | 345/532 |
| 2010/0296571 A1 | * | 11/2010 | El-Saban et al. | 375/240.01 |

OTHER PUBLICATIONS

PiMaster(359). 'RE: Flattening of 2D Array Effciently'. (A forum for c++) [online]. Dec. 2010. [retrieved Jan. 5, 2014]. Retrieved from the Internet: <http://www.cplusplus.com/forum/beginner/32587/>.*

* cited by examiner

*Primary Examiner* — Jacinta M Crawford
*Assistant Examiner* — Terrell Robinson
(74) *Attorney, Agent, or Firm* — Robert D. Marshall, Jr.; Frank D. Cimino

(57) ABSTRACT

A method includes reading a composite video descriptor data structure and a plurality of window descriptor data structures. The composite video descriptor data structure defines a width and height of a composite video frame and each window descriptor data structure defines the starting X and Y coordinate, width and height of each constituent video window to be rendered in the composite video frame. The method further includes determining top and bottom Y coordinates for each constituent video window, as well as determining left and right X coordinates for each constituent video window. The method also includes dividing each constituent video window using the top and bottom Y coordinates to obtain Y-divided sub-windows, dividing each Y-divided sub-window using left and right X coordinates to obtain X and Y divided sub-windows, and storing X, Y coordinates of opposing corners of each X and Y divided sub-window in the storage device.

10 Claims, 7 Drawing Sheets

OPTIMIZED ALGORITHM FOR CONSTRUCTION OF COMPOSITE VIDEO FROM A SET OF DISCRETE VIDEO SOURCES

CROSS-REFERENCE TO RELATED APPLICATION

None.

BACKGROUND

It is often desirable to display two or more separate video sources on one display simultaneously. Picture-In-Picture (PIP) is one such format in which two video sources are displayed, one appearing to be on top of the other. Display devices typically function in a raster mode in which the pixels of the display device are rendered in sequential order starting with the top left pixel, continuing to the right along the first line, then dropping down to the left side of the second line, continuing along the second line, and so on to the bottom line of pixels to complete one full video frame. The rasterization process repeats typically at a rate of 30 or 60 frames per second.

Rendering multiple video sources is inherently incompatible with rasterization process of a display device, as the display device is incapable of rendering just a single video source on a portion of the display. As explained above, the display rasterizes across all pixels of the display 30 times per second, and not just a subset of the pixels.

SUMMARY

Construction of composite video is described herein that does not require construction of the composite video in memory. Instead, the composite video is constructed on-the-fly as it is written to the video encoder.

For example, a method includes reading a composite video descriptor data structure and a plurality of window descriptor data structures. The composite video descriptor data structure defines width and height of a composite video frame and each window descriptor data structure defines the starting X and Y coordinate, width and height of each constituent video window to be rendered in the composite video frame. The method further includes determining top and bottom Y coordinates for each constituent video window, as well as determining left and right X coordinates for each constituent video window. The method also includes dividing each constituent video window using the top and bottom Y coordinates to obtain Y-divided sub-windows, dividing each Y-divided sub-window using left and right X coordinates to obtain X and Y divided sub-windows, and storing X, Y coordinates of opposing corners of each X and Y divided sub-window in the storage device.

Another method includes computing an ordering key for each sub-window to be assembled into a composite video frame. Further, based on the ordering keys, the method includes determining an order for the sub-windows to be assembled into the composite video frame, and writing, by a direct memory access (DMA) engine, video data for each sub-window from non-contiguous memory to an encoder as composite video based on the determined order.

In yet another embodiment, an apparatus includes a processor and storage coupled to the processor. The storage contains a composite video descriptor data structure and a plurality of window descriptor data structures. The composite video descriptor data structure defines a width and height of a composite video frame, and each window descriptor data structure defines starting X and Y coordinates, width and height of each constituent video window to be rendered in the composite video frame. The processor uses the composite video descriptor and window descriptor data structures to determine top and bottom Y coordinates for each constituent video window, determine left and right X coordinates for each constituent video window, divide each constituent video window using the top and bottom Y coordinates to obtain Y-divided sub-windows, divide each Y-divided sub-window using left and right X coordinates to obtain X and Y divided sub-windows, and store X, Y coordinates of opposing corners of each X and Y divided sub-window in the storage.

Another apparatus includes a processor and storage coupled to the processor and containing information on each of a plurality of sub-windows to be included in a composite video frame. The processor computes an ordering key for each sub-window to be included into the composite video frame. Based on the ordering keys, the processor determines an order for the sub-windows to be included into the composite video frame. The apparatus also includes a direct memory access (DMA) engine coupled to the processor and storage. The DMA engine writes video data for each sub-window from non-contiguous storage to an encoder as composite video based on the order determined by the processor.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Some video systems capable of simultaneously displaying multiple video sources by first assembling the composite video frame from the various video sources in memory and then performing a memory write to a video encoder to cause the composite video to be rendered on display device. This so-called "in-memory construction of composite video frames" unfortunately requires a high degree of processor support and greater memory bandwidth.

The embodiments disclosed herein are directed to constructing a composite video frame "on the fly" meaning the step of assembling the composite frame in memory before transferring the frame to the encoder is avoided. Instead, the composite frame is constructed and transferred to the encoder at the same time.

Figure 1:
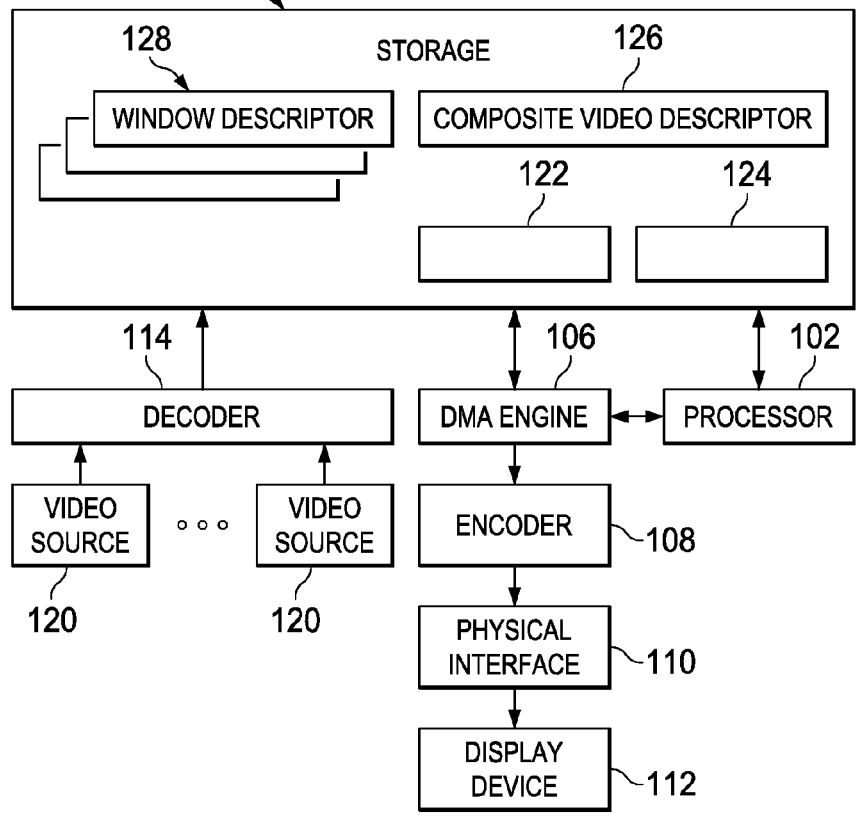
FIG. 1 shows a system for constructing composite video in accordance with various embodiments of the invention.

FIG. 1 illustrates a system 100 in accordance with various embodiments. The system 100 includes a processor 102 coupled to storage 104 and a direct memory access (DMA) engine 106. The storage 104 may comprise volatile storage (e.g., random access memory), non-volatile storage (e.g., hard disk drive, sold-state storage, read-only memory), etc.), or combinations of volatile and non-volatile storage. The DMA engine 106 can be programmed by the processor 102 to write contents of storage 104 to an encoder 108. The encoder 108 converts input video data to a format compatible with a display device 112 and provides the encoded video data to a physical interface (PHY) 110 which provides the appropriate electrical signaling to the display device 112.

Video data from one or more video sources 120 can be stored in storage 104. A video source may be a digital camera, another storage device on which a video signal has already been stored, etc. Decoder 114 decodes the video signal from the video sources and stores the decoded video data in storage 104. Reference numerals 122 and 124 illustrate decoded video data from the video storage devices 120.

Figure 2:
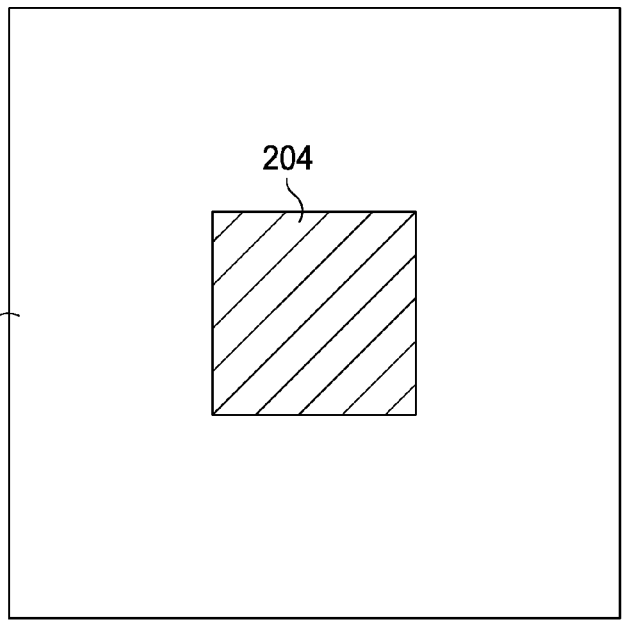
FIG. 2 shows an example of a composite video constructed using the system of claim 1.

FIG. 2 shows an example of a composite video frame 200 to be constructed in accordance with the embodiments described herein. The composite video frame 200 comprises two video sources 202 and 204 simultaneously rendered on a display device. Video source 204 appears to be rendered "on top of" video source 202 in a Picture-In-Picture (PIP) effect. Each video source 202, 204 is referred to as a "video window." The following description describes how the composite video frame 200 is constructed. The described process constructs a composite video frame preferably 30 times per second.

For each composite video to be constructed, storage 104 also stores a composite video descriptor (CVD) data structure 126 and one or more window descriptor (WD) data structures 128. The CVD data structure 126 preferably defines the height and width of the composite video window, the number of constituent video windows that are to be rendered as part of the composite video, and pointers to WD data structures 128 defining the various constituent video windows. Each WD data structure 128 defines the height and width of the video window of the corresponding video window to be included as part of the composite video, the coordinate (X and Y) of the starting pixel of the video window, a priority value, and a pointer to the video data that represents the video window. The starting pixel preferably is the upper left most pixel in the video window, but can be other than the upper left most pixel in other embodiments. For a composite video containing two video windows, the composite video is represented by one CVD data structure 126 to define the size and shape of the composite video window as well as two WD windows to define the size, shape and video contents of each constituent video window.

The data structures 126, 128 may be created by the processor 102 in response, for example, to input by a user via an input device (e.g., keyboard, mouse, remote control, etc.) as to how the composite video is to be rendered on display device 112.

Figure 3:
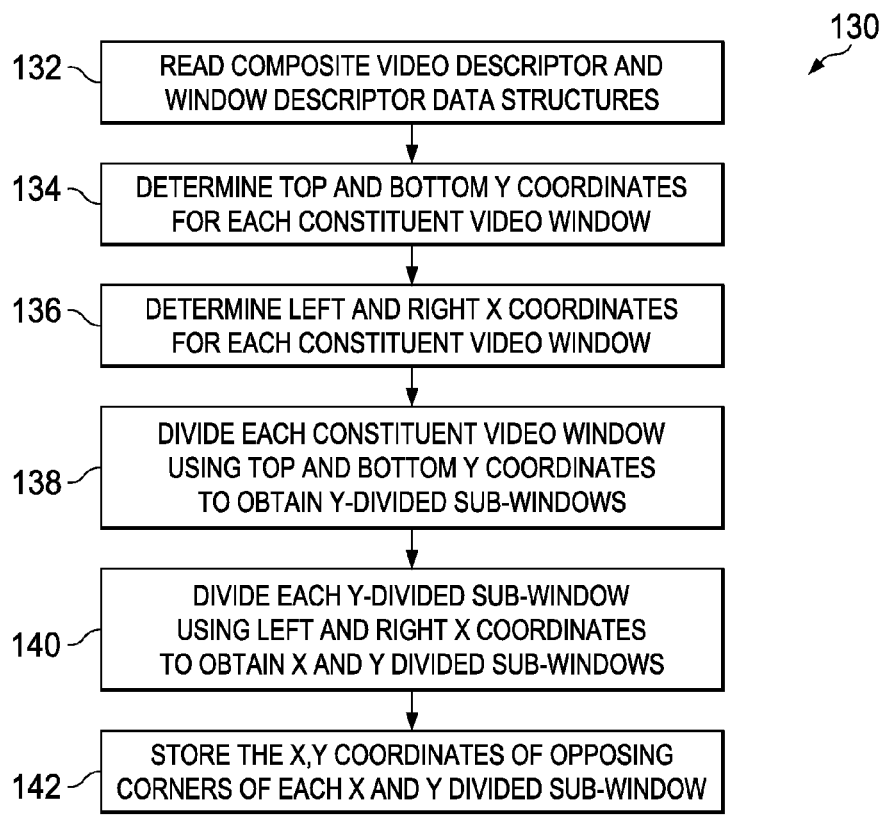
FIG. 3 shows a method performed by the system of claim 1 for constructing composite video.

FIG. 3 illustrates a method 130 preferably performed by the processor 102. The various actions depicted in FIG. 3 can be performed in the order shown or in a different order, and two or more actions can be performed in parallel rather than sequentially. As the method 130 of FIG. 3 is explained, reference will be made to an example depicted in FIGS. 4-8.

Figure 4:
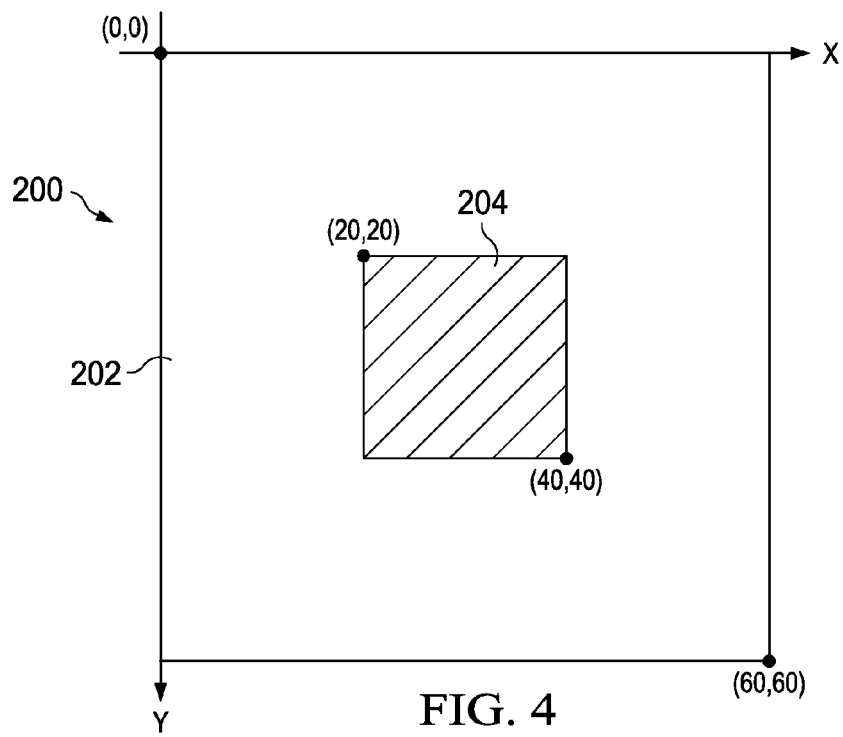
FIGS. 4 to 8 show examples of various steps in the process for how the composite video of FIG. 2 is constructed.
Figure 5:
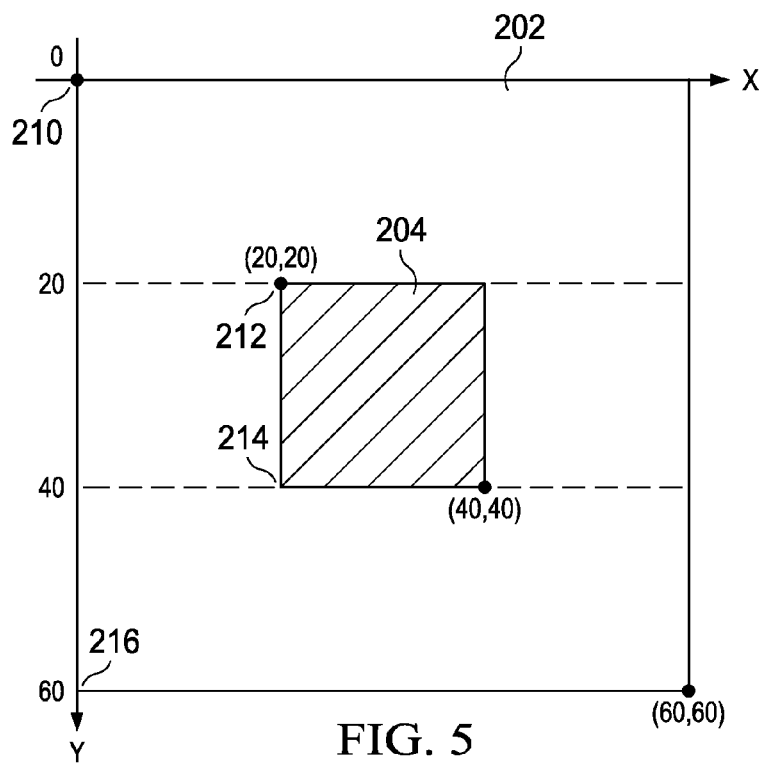
Figure 6:
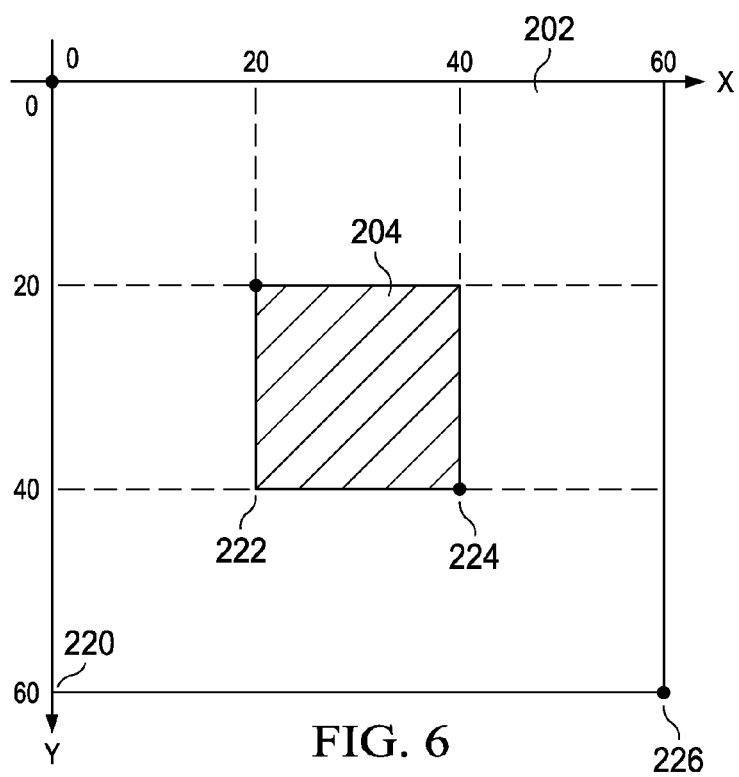

At 132, the processor 102 reads the CVD and corresponding WD data structures 126, 128 from storage 104. At 134, the processor determines the top and bottom Y coordinates for each constituent video window defined by the data structures. FIGS. 4 and 5 show an example of this process. In FIG. 4, the composite video frame defined by the data structures is placed in the fourth quadrant of an X-Y Cartesian coordinate system. The Y pixel coordinates are assumed to be positive in this example. As shown, the starting pixel for the composite video frame has a coordinate of (0, 0). In this example, the composite video frame has a width of 60 pixels (60 pixels along the X axis) and has a height of 60 pixels (60 pixels along Y axis). Based on the starting pixel coordinate, width and height of the composite video frame, the lower right most pixel has a coordinate of (60, 60).

Reference numeral 202 identifies a larger video window in which one video source is rendered, and reference numeral 204 identifies a smaller video window in which another video is rendered. Smaller video window 204 is itself defined by a starting pixel having a coordinate of (20, 20) and has a width of 20 pixels and a height of 20 pixels as well. Based on the starting pixel coordinate, width and height of the video window 204, the lower right most pixel of window 204 has a coordinate of (40, 40).

FIG. 5 illustrates the top and bottom Y coordinates for each constituent video window in the example of FIG. 4. Top and bottom Y coordinates for video window 202 is 0 and 60, respectively. Top and bottom Y coordinates for smaller video window 204 is 20 and 40, respectively.

Referring again to FIG. 3, at 136 method 130 comprises determining the left and right X coordinates for each constituent video window. This determination is made based on the starting X coordinate and width of each video window as provided in WD data structure 128. The left and right X coordinate for larger video window 202 is 0 and 60, respectively, while the left and right X coordinate for smaller video window 204 is 20 and 40, respectively.

Once the top and bottom Y coordinate and left and right X coordinate of each constituent video window is determined, then at 138 the method comprises dividing each constituent video window using the top and bottom Y coordinates determined at 134 to obtain "Y-divided sub-windows." A Y-divided sub-window is a portion (a sub-window) of a video window that has been divided based on a Y coordinate. Each window is divided only for Y values that are greater than the window's starting Y coordinate and less than the sum of the starting Y coordinate and the window's height.

Figure 7:
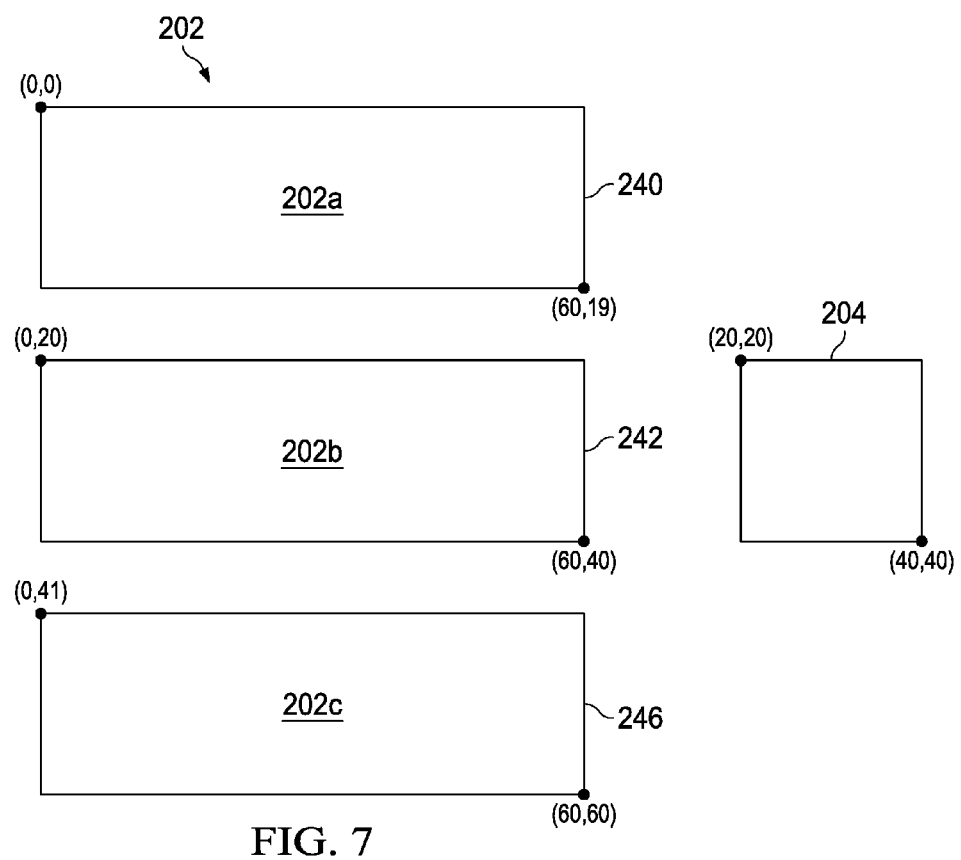

This process is exemplified in FIG. 7. For the larger video window 202, the starting Y coordinate is 0 and the sum of the starting coordinate (0) and the window's height (60) is 60.

Thus, window 202 is divided based on all top and bottom Y coordinates determined at 134 that are greater than 0 and less than 60. As shown in FIG. 5, the top and bottom Y coordinates determined at 134 are 0, 20, 40, and 60. Of those four coordinates, only Y coordinates 20 and 40 are greater than 0 and less than 60, and thus coordinates 20 and 40 are used to divide the larger video window 202. As such, video window 202 is divided into three Y-divided sub-windows 202a, 202b, and 202c as shown. The space between the three sub-windows is not actually present as the three sub-windows abut one another-the space is merely present in FIG. 7 for ease of understanding the process. The upper sub-window 202a has a starting coordinate of (0, 0) and, due to the division on Y coordinate 20, a height of 20 meaning its lower right pixel has a coordinate of (60, 19). The middle sub-window 202b has a starting coordinate of (0, 20) and, due to the further division of video window 202 on Y coordinate 40, sub-window 202b has a height of 20 resulting in its lower right pixel having a coordinate of (60, 40). Finally, the lower sub-window 202c has a starting coordinate of (0, 41) and a lower right pixel coordinate of (60, 60).

The starting Y coordinate of video window 204 is (20, 20) and, based on its height of 20, the sum of its starting Y coordinate (20) and its height (20) is 40. From FIG. 5, there are no Y coordinates that are greater than 20 and less than 40, and thus video window 204 is not divided at 138. Thus, when action 138 refers to each constituent video window being divided, this process is only for those constituent windows that meet the criteria noted above and thus can be sub-divided. Note that in FIG. 7, video window 204 is shown off to the right for convenience, but actually overlaps the middle sub-window 202b.

At 140, the method further comprises dividing each Y-divided sub-window using the left and right X coordinates determined at 136 to thereby obtain "X and Y divided sub-windows." These are windows that have been divided both on X and Y. Each Y-divided sub-window is divided based on two criteria:

(1) for X values that are greater than a window's starting X coordinate and less than the sum of the starting X coordinate and the window's width, and (2) only those Y-divided sub-windows are divided on X that have a top Y coordinate that equals the starting Y co-ordinate Y (i.e., starting Y co-ordinate of middle sub-window 202b equals to starting Y co-ordinate of video window 204. This condition checks that two windows are overlapping.

Figure 8:
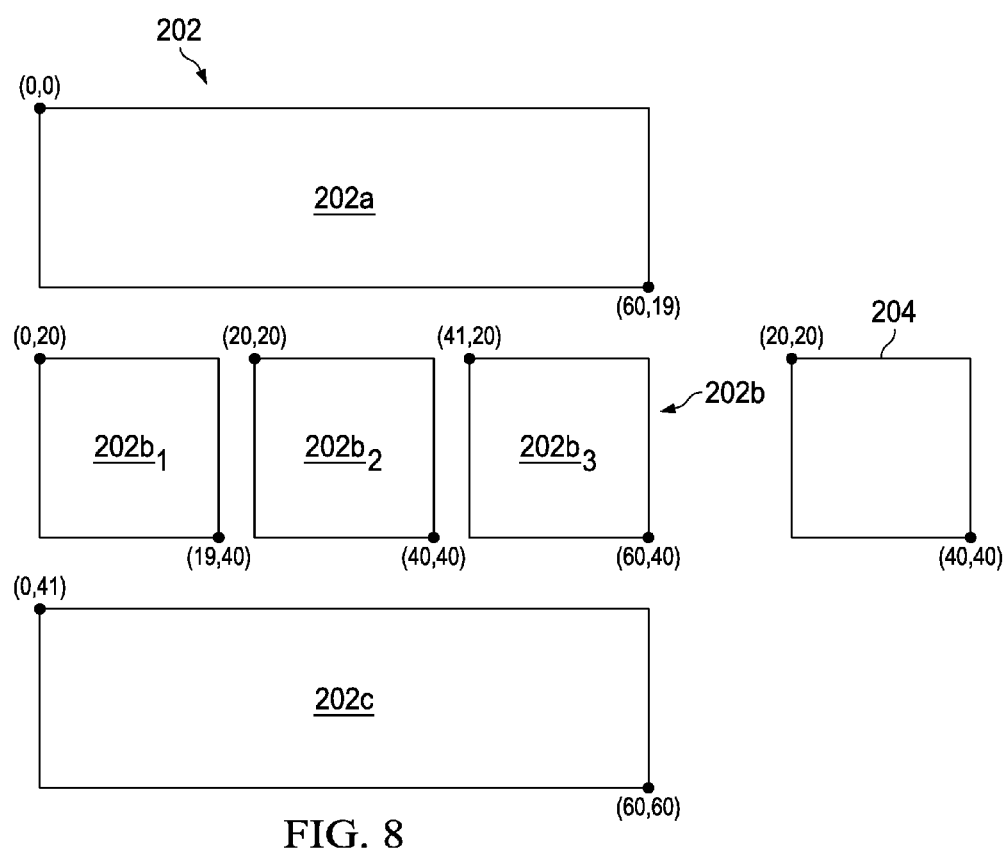

This process is exemplified in FIG. 8. For the upper Y-divided sub-window 202a, the starting X coordinate is 0 and the sum of the starting coordinate (0) and the window's width (60) is 60. Thus, Y-divided sub-window 202a is not further sub-divided on X because both criteria above are not met. Specifically, 0 (the starting Y co-ordinate of sub-window 202a) does not equal 20 (the starting Y co-ordinate of video window 204). A similar analysis applies to bottom Y-divided sub-window 202c. However, middle Y-divided sub-window 202b is divided on X because both criteria are met. That is, 20 (the starting Y co-ordinate of middle Y-divided sub-window 202b) equals 20 (the starting Y co-ordinate of video window 204). As a result, middle Y-divided sub-window 202b is divided on X resulting in three X and Y divided windows 202b₁, 202b₂, and 202b₃ as shown. Note that the middle X and Y divided sub-window 202b₂ but is shown off to the right for clarity purposes.

Referring again to FIG. 3, the X,Y coordinates of opposing corners (e.g., upper left and lower right) of each X and Y divided sub-window (e.g., 202b₁, 202b₂, and 202b₃) as well as those Y-divided sub-windows (202a and 202c) that were not further divided on X and those video windows that were not divided even on Y (e.g., window 204) are stored in storage 104. These are the various windows comprising the composite video frame. Some or all of each constituent video source is rendered into each such sub-window.

Figure 9:
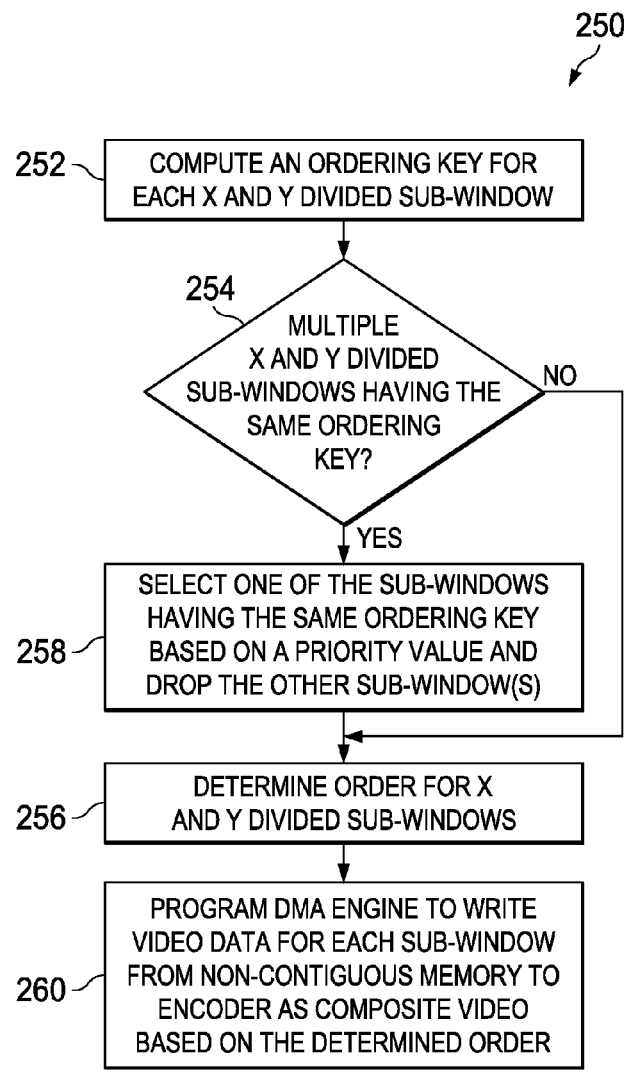
FIG. 9 shows a method for determining the order for how the various sub-windows in the composite video are to be written to a video encoder.

FIG. 9 describes an illustrative method 250 that determines the order for how the various sub-windows are to be populated with video data. The processor 102 may perform the actions illustrated in FIG. 9. The various actions depicted in FIG. 9 can be performed in the order shown or in a different order, and two or more actions can be performed in parallel rather than sequentially.

At 252, the method of FIG. 9 includes computing ordering keys for the various sub-windows resulting from method 130 of FIG. 3. An embodiment of a formula to compute each such ordering key includes the use of a constant. The constant preferably is greater than the largest X coordinate (e.g., right edge) of each sub-window (which would be the X co-ordinate of composite video 202). In the above example, the largest X coordinate is 60 and thus for this example, the constant is chosen to be 100. The ordering key formula is computed as:

$$\text{Ordering key} = (Y)(\text{CONSTANT}) + X \qquad (1)$$

where X and Y are the starting coordinate of the sub-window and CONSTANT is 100 in this example. Referring again to FIG. 8, the ordering keys for the six windows shown are as follows:

| Window | Ordering key |
| --- | --- |
| 202a | (0)(100) + 0 = 0 |
| 202b₁ | (20)(100) + 0 = 2000 |
| 202b₂ | (20)(100) + 20 = 2020 |
| 202b₃ | (20)(100) + 41 = 2041 |
| 202c | (41)(100) + 0 = 4100 |
| 204 | (20)(100) + 20 = 2020 |

Figure 10:
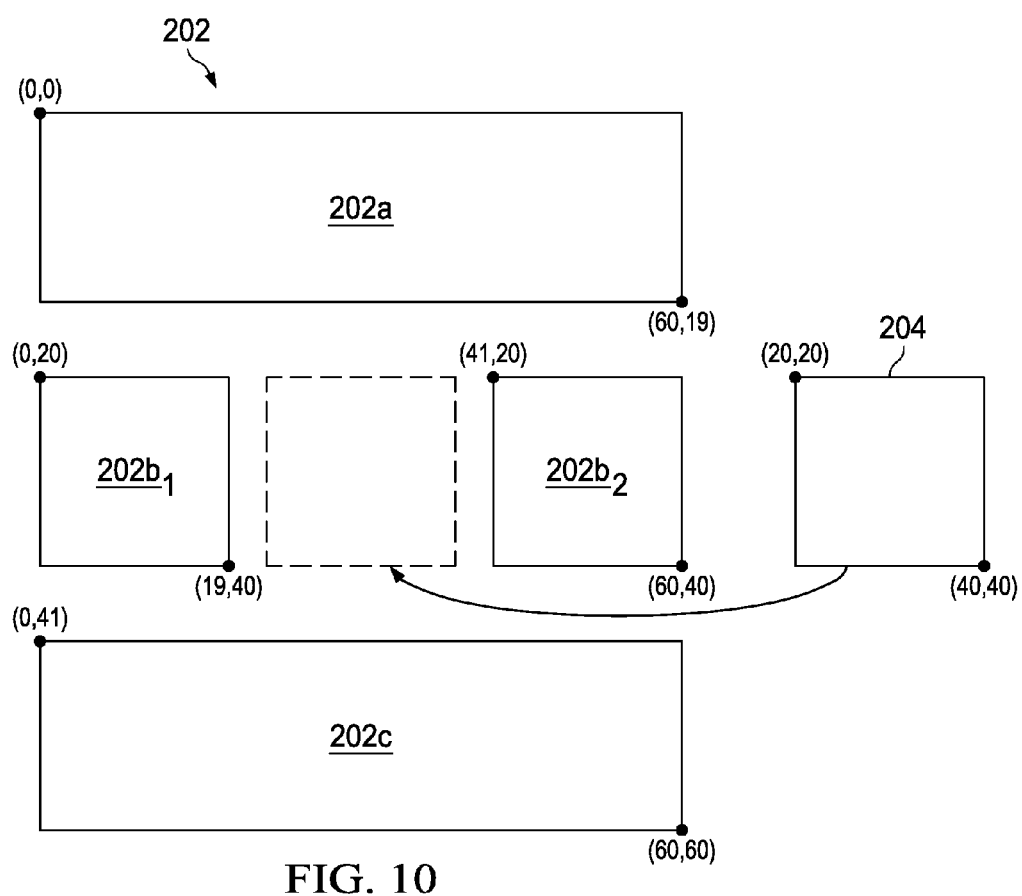
FIG. 10 provides a further example usable to illustrate the method of FIG. 9.

At 254, the method includes determining whether multiple sub-windows have the same value for their ordering key. In the present example, X and Y divided sub-window 202b₂ and 204 have the same ordering key value 202. That two windows have the same value of the ordering key means that those two windows completely or exactly overlap one another. Thus, only one of the windows should be rendered and the other dropped (ignored). The priority value mentioned above that is stored in the WD data structure 128 for each video window is used in this regard. In some implementations, a window having a lower priority than another window is dropped. If multiple windows have the same ordering key, then at 258, the method comprises selecting one of the windows based on the priority value and dropping the remaining window(s). In the present example, video window 204 has a higher priority value than video window 202 and thus X and Y divided sub-window 202b₂ is dropped and video window 204 is used instead. This is illustrated in FIG. 10.

At 256, the ordering key values for the remaining windows are used to determine the order of the various windows and sub-windows to construct the composite video frame. The various windows are placed in order from smallest ordering key value to largest. In the present example, the order determined at 256 is: 202a, 202b₁, 204, 202b₃, and 202c.

Once 202b₁ is reached and because the display renders the pixels across each entire row of the display device 112, the DMA engine then assembles the next rows by first pulling window 202 data from the first row corresponding to sub-window 202b₁, and then pulls data from the first row of window 204 followed by data from window 202 corresponding sub-window 202$b_2$. That process continues until the first row of bottom sub-window 202$c$ is reached at which time the DMA writes data from window 202 corresponding to sub-window 202$c$ to the encoder.

As such, the composite video frame is generated on-the-fly. The preferred embodiments described above can support any complex composite video layout and dramatically reduces memory bandwidth requirements for video compositions which otherwise require in-memory composition as noted above. As a result, the load on the processor and memory is reduced. Further, the number of sub-windows that can be supported is not dependent on hardware.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method, comprising:
reading, by a processor from a storage device, a composite video descriptor data structure and a plurality of window descriptor data structures, the composite video descriptor data structure defining a width and height of a composite video frame and each window descriptor data structure defining starting X and Y coordinates, width and height of each constituent video window to be rendered in the composite video frame;
determining, by the processor, top and bottom Y coordinates for each constituent video window;
determining, by the processor, left and right X coordinates for each constituent video window;
dividing, by the processor, each constituent video window using the top and bottom Y coordinates to obtain Y-divided sub-windows;
dividing, by the processor, each Y-divided sub-window using left and right X coordinates to obtain X and Y divided sub-windows;
computing, by the processor, an ordering key for each X and Y divided sub-window by multiplying a Y coordinate for the X and Y divided sub-window by a constant to produce a product, and adding an X coordinate for the X and Y sub-divided window to the product; and
storing, by the processor, X, Y coordinates of opposing corners of each X and Y divided sub-window in the storage device.

2. The method of claim 1 wherein the constant is greater than or equal to largest X coordinate of the X and Y sub-divided window.

3. The method of claim 1 further comprising determining, by the processor, an order for the X and Y divided sub-windows based on the ordering key computed for each X and Y divided sub-window.

4. The method of claim 3 further comprising programming a direct memory access (DMA) engine to write video data to an encoder as composite video based on the determined order for the X and Y divided sub-windows.

5. The method of claim 1 wherein determining the order for the X and Y divided sub-windows comprises determining whether any two or more X and Y divided sub-windows have the same ordering key.

6. An apparatus, comprising:
a processor;
storage coupled to the processor, said storage containing a composite video descriptor data structure and a plurality of window descriptor data structures, wherein the composite video descriptor data structure defines a width and height of a composite video frame, and each window descriptor data structure defines starting X and Y coordinates, width and height of each constituent video window to be rendered in the composite video frame;
wherein the processor uses the composite video descriptor and window descriptor data structures to:
determine top and bottom Y coordinates for each constituent video window;
determine left and right X coordinates for each constituent video window;
divide each constituent video window using the top and bottom Y coordinates to obtain Y-divided sub-windows;
divide each Y-divided sub-window using left and right X coordinates to obtain X and Y divided sub-windows;
compute an ordering key for each X and Y divided sub-window by multiplying a Y coordinate for the X and Y divided sub-window by a constant to produce a product and adding an X coordinate for the X and Y sub-divided window to the product; and
store X, Y coordinates of opposing corners of each X and Y divided sub-window in the storage.

7. The apparatus of claim 6 wherein the constant is greater than or equal to largest X coordinate of the X and Y sub-divided window.

8. The apparatus of claim 6 wherein the processor determines an order for the X and Y divided sub-windows based on the ordering key computed for each X and Y divided sub-window.

9. The apparatus of claim 8 further comprising a direct memory access (DMA) engine and wherein the processor programs the DMA engine to write video data to an encoder as composite video based on the determined order for the X and Y divided sub-windows.

10. The apparatus of claim 6 wherein the processor determines the order for the X and Y divided sub-windows by determining whether any two or more X and Y divided sub-windows have the same ordering key.

* * * * *